United States Patent
Li

(10) Patent No.: US 7,762,851 B2
(45) Date of Patent: Jul. 27, 2010

(54) SIM CARD FIXING ASSEMBLY

(75) Inventor: Han-Yu Li, Tu-Cheng (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 0 days.

(21) Appl. No.: 12/541,254

(22) Filed: Aug. 14, 2009

(65) Prior Publication Data

US 2010/0159729 A1 Jun. 24, 2010

(30) Foreign Application Priority Data

Dec. 19, 2008 (CN) .................. 2008 1 0306405

(51) Int. Cl.
*H01R 24/00* (2006.01)
(52) U.S. Cl. .................. 439/630; 439/327; 379/433.09
(58) Field of Classification Search .................. 439/946
See application file for complete search history.

(56) References Cited

U.S. PATENT DOCUMENTS

| | | | | |
|---|---|---|---|---|
| 5,563,397 A * | 10/1996 | Fujimoto et al. | ............ | 235/441 |
| 5,831,256 A * | 11/1998 | De Larminat et al. | ....... | 235/486 |
| 5,949,048 A * | 9/1999 | Nakamura et al. | .......... | 235/439 |
| 6,580,923 B1 * | 6/2003 | Kubo | .......................... | 455/558 |
| 6,831,977 B2 * | 12/2004 | Kiernan et al. | ......... | 379/433.09 |
| 6,969,282 B2 * | 11/2005 | Liu | .............................. | 439/630 |
| 7,093,764 B1 * | 8/2006 | Valenzuela et al. | .......... | 235/486 |
| 7,238,038 B2 * | 7/2007 | Kumagai | .................... | 439/326 |
| 7,280,846 B2 * | 10/2007 | Lin | ............................ | 455/558 |
| 7,306,491 B1 * | 12/2007 | Wei | ............................ | 439/630 |
| 7,350,705 B1 * | 4/2008 | Frederick et al. | ............ | 235/441 |
| 2006/0205258 A1 * | 9/2006 | Cho et al. | ................... | 439/326 |

* cited by examiner

*Primary Examiner*—Michael C Zarroli
(74) *Attorney, Agent, or Firm*—Steven M. Reiss

(57) ABSTRACT

A SIM card fixing assembly is used for fixing a SIM card to an electronic device. The electronic device includes a housing. The SIM card fixing assembly includes a receiving portion defined in the housing, a rotary member and a latching member. The rotary member is rotatable relative to the housing. The latching member is slidably fixed to the rotary member. A side surface of the receiving portion defines a retaining groove to receive an end of the SIM card. The rotary member includes a latching portion. The latching member includes a first plate and a second plate extending from an edge of the first plate. The first plate includes a resilient hook extending toward to the second plate. The second plate defines a latching slot to receive the other end of the SIM card. When the latching member is slid relative to the rotary member, the other end of the SIM card is latched into the latching slot, the resilient hook is engaged with the latching portion.

20 Claims, 5 Drawing Sheets

SIM CARD FIXING ASSEMBLY

BACKGROUND

1. Technical Field

The present disclosure relates to SIM card (subscriber identification module cards, hereinafter referred to as SIM) fixing assemblies and, particularly, to a SIM card fixing assembly for fixing a SIM card in an electronic device such as a mobile phone.

2. Description of the Related Art

Mobile phones are widely used and bring convenience to ours lives, and have become a part of modern life. Some mobile phone has a SIM card for carrying information which is necessary for people to operate the mobile phone. The SIM card is used to store data, for example, contact information. Therefore, a SIM card fixing assembly is necessary for fixing the SIM card in electronic device such as mobile phones.

A typical SIM card fixing assembly includes a mounting base and a locking member. The mounting base defines a receiving groove, a slot, and a protrusion. The protrusion and the slot are arranged at two sides of the receiving groove. The receiving groove is configured to receive a SIM card. The locking member includes a main board having a bending piece and a bending rim at two opposite ends thereof. The bending rim is engaged with the slot. The bending piece is engaged with the mounting base so as to lock the SIM card in the receiving groove. The main board further includes a resilient clip resisting the protrusion when the bending piece is engaged with the base. When the resilient clip is pulled to move away from the protrusion, the locking member is slidable relative to the base, such that the locking member is removable from the base.

However, when a mobile phone with the SIM card is stolen, the mobile phone may be reused by replacing the SIM card. Thus, the SIM card fixing assembly does not have theft-protection.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
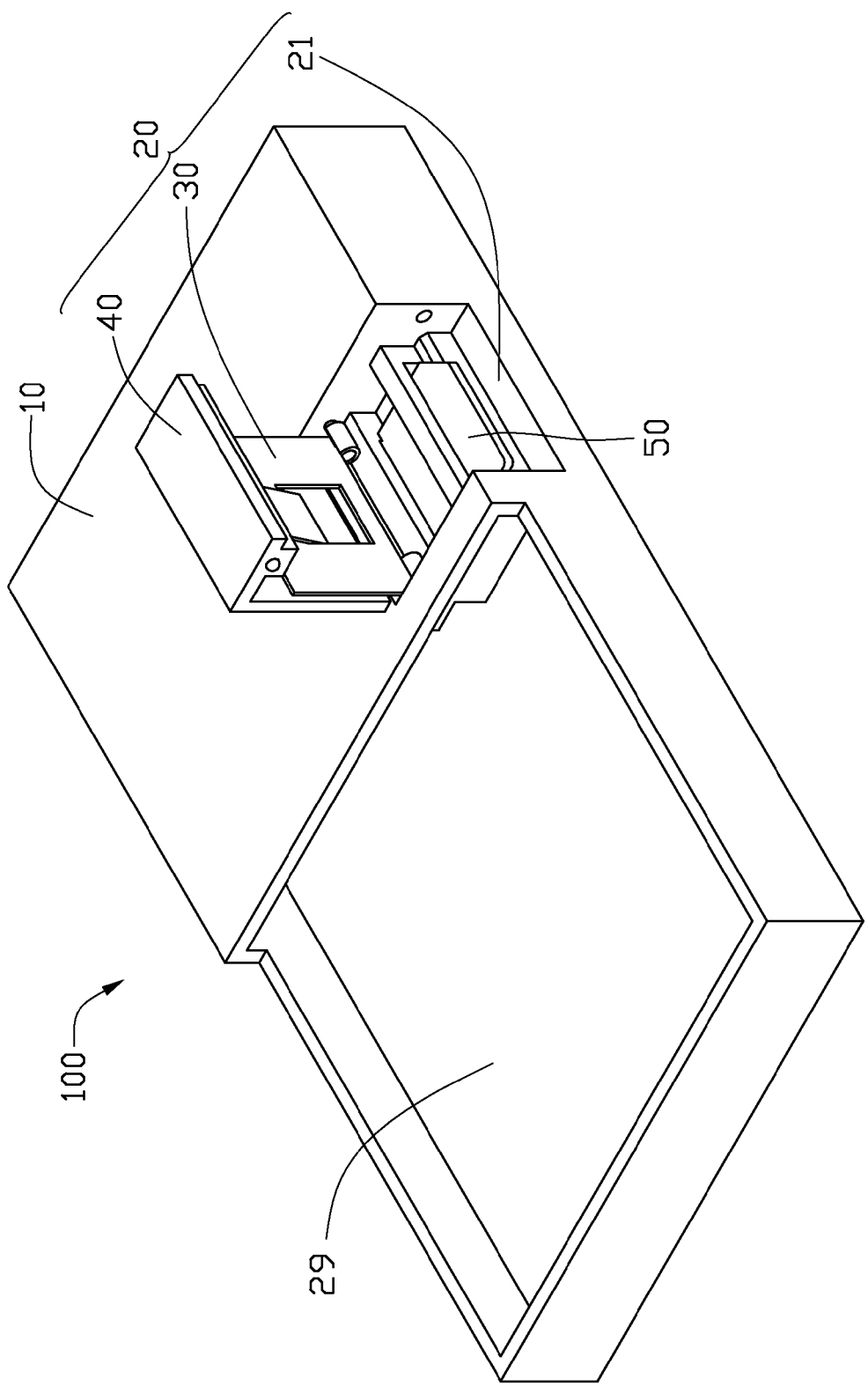
FIG. 1 is an isometric view of an embodiment of a SIM card fixing assembly, the SIM card fixing assembly including a rotary member, a latching member and a receiving portion defined in a housing.

Referring to FIG. 1, an exemplary embodiment of a SIM card fixing assembly 20 for fixing a SIM card 50 to an electronic device 100 is shown. The electronic device 100 includes a housing 10. The SIM card fixing assembly 20 includes a receiving portion 21 defined in the housing 10, a rotary member 30, and a latching member 40. The rotary member 30 is rotatable relative to the housing 10. The latching member 30 is slidably fixed to the rotary member 40.

Figure 2:
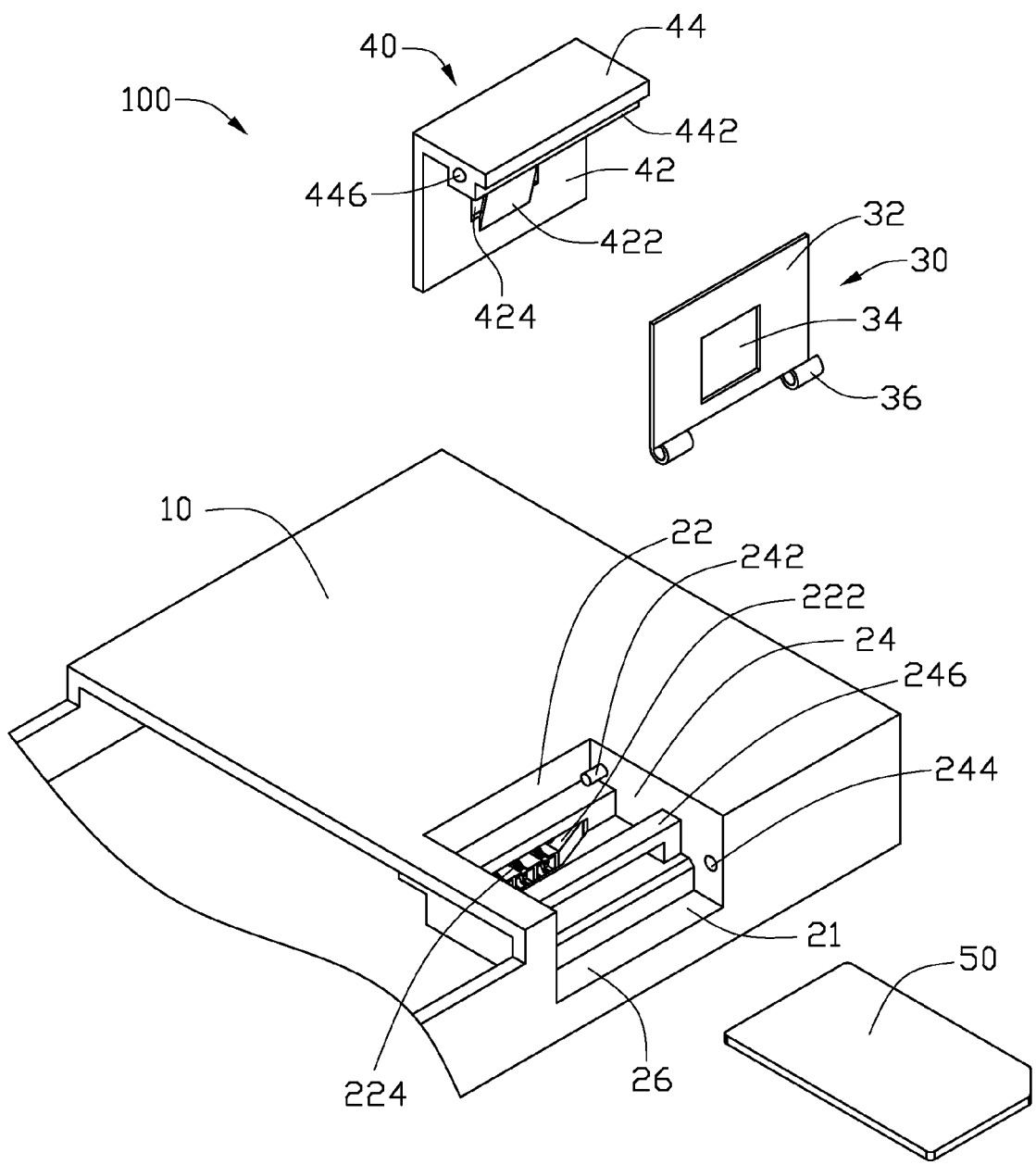
FIG. 2 is an exploded, partial, isometric view of the SIM card fixing assembly of FIG. 1.

Referring to FIG. 2, the receiving portion 21 is a square-shaped cutout. The receiving portion 21 includes a first side surface 22, two second side surfaces 24, and a bottom surface 26 adjoining the first side surface 22 and the two second side surfaces 24. The first side surface 22 is substantially three-step-shaped. The SIM card fixing assembly 20 further includes a retaining groove 222 defined in the second step of the first surface 22 and three resilient connecting portions 224. The three resilient connecting portions 224 are positioned on the bottom of retaining groove 222. The three resilient connecting portions 224 are electrically connected to the SIM card 50. The SIM card fixing assembly 20 further includes two shafts 242, two latching grooves 244 defined in the two second side surfaces 24 correspondingly, and a positioning bridge 246. The two shafts 242 are positioned on the two second side surfaces 24, respectively. The positioning bridge 246 is positioned between the two second side surfaces 24 to fix the SIM card 50 in the receiving portion 21.

The rotary member 30 includes a main board 32, a latching portion 34, and two shaft tubes 36. In the illustrated embodiment, the latching portion 34 is a latching hole defined in middle of the main board 32. The two shaft tubes 36 extend from an edge of the main board 32, and are spaced apart at two ends of the edge of the main body 32. Each of the shaft tubes 36 defines an elongated cutout 362 extending along an axis of the shaft roll 36. The two shafts 252 are sleeved in the corresponding shaft roll 36.

Figure 3:
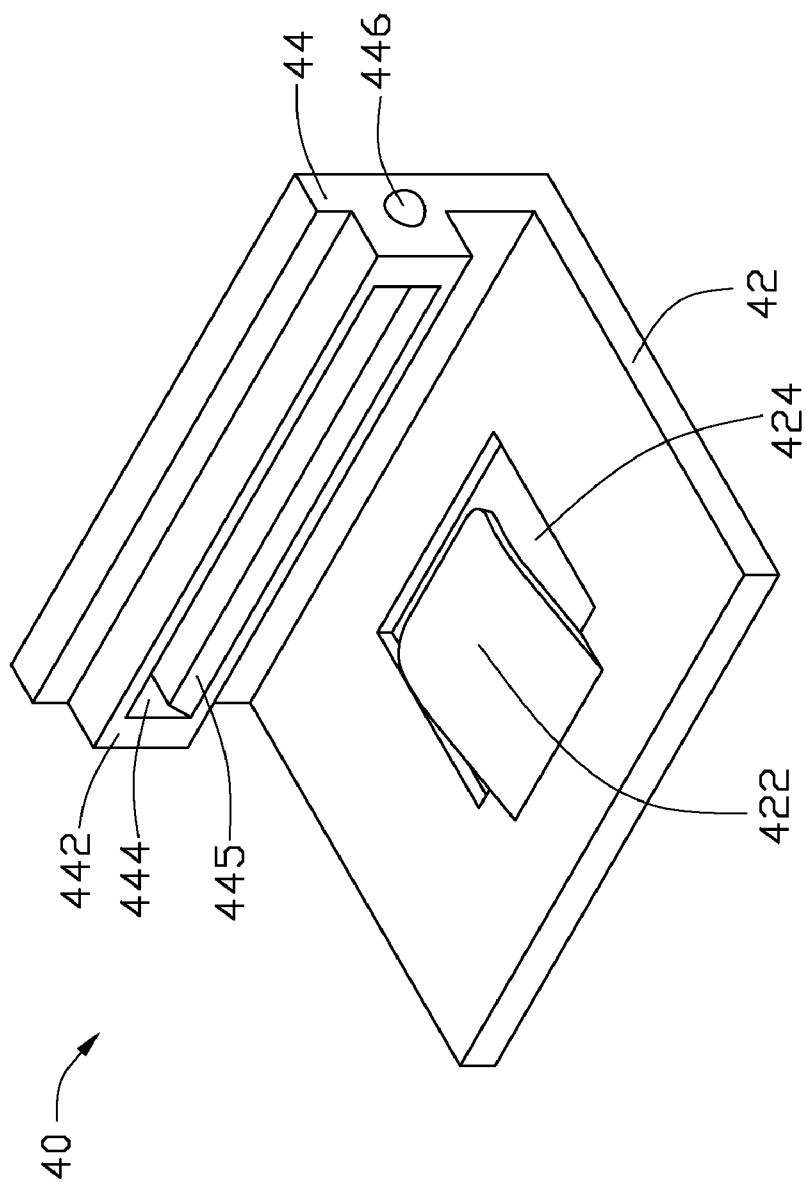
FIG. 3 is an enlarged, isometric view of latching member of the SIM card fixing assembly shown in FIG. 2.
Figure 4:
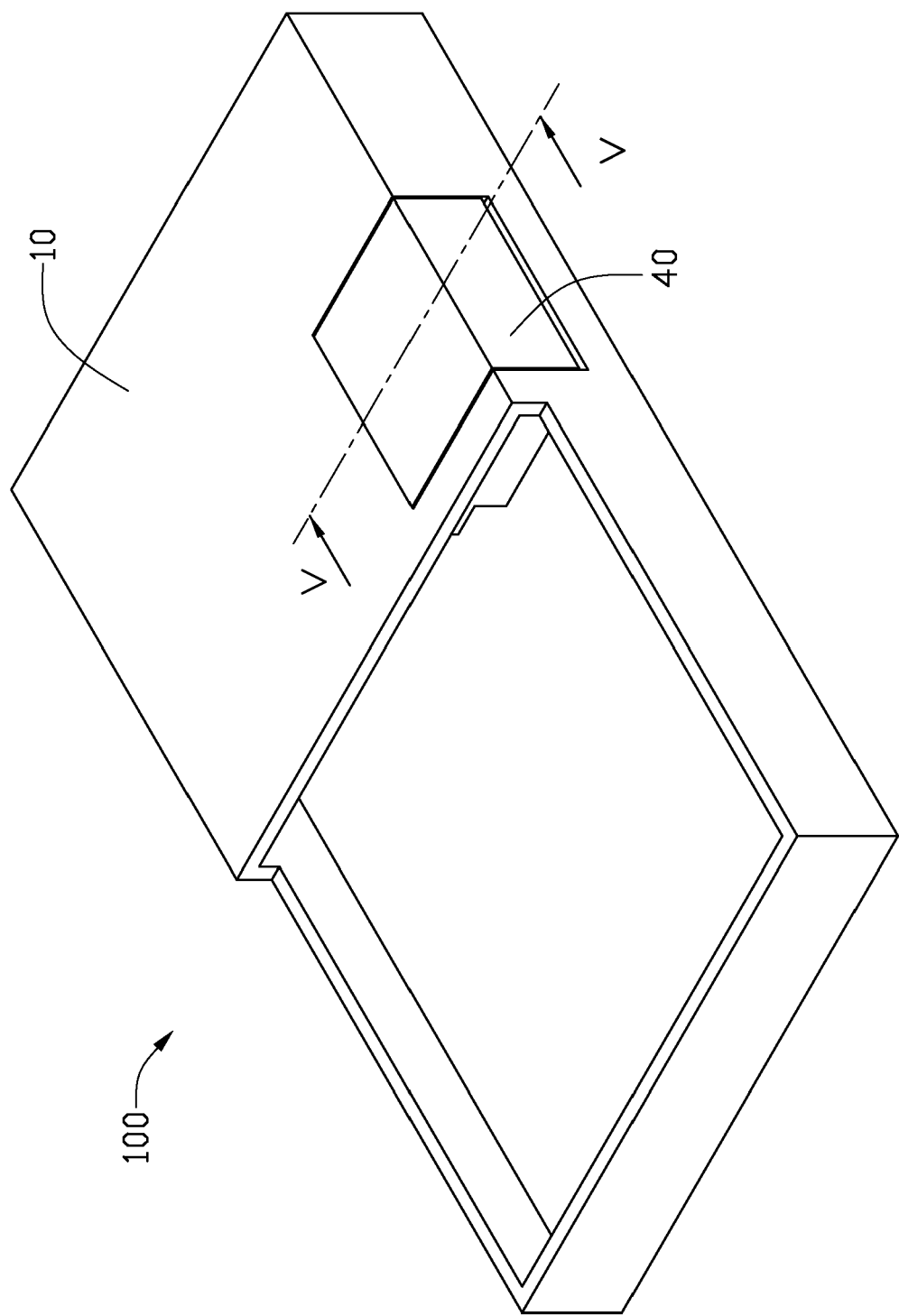
FIG. 4 is an isometric view of the SIM card fixing assembly of FIG. 1 fixed with a SIM card.
Figure 5:
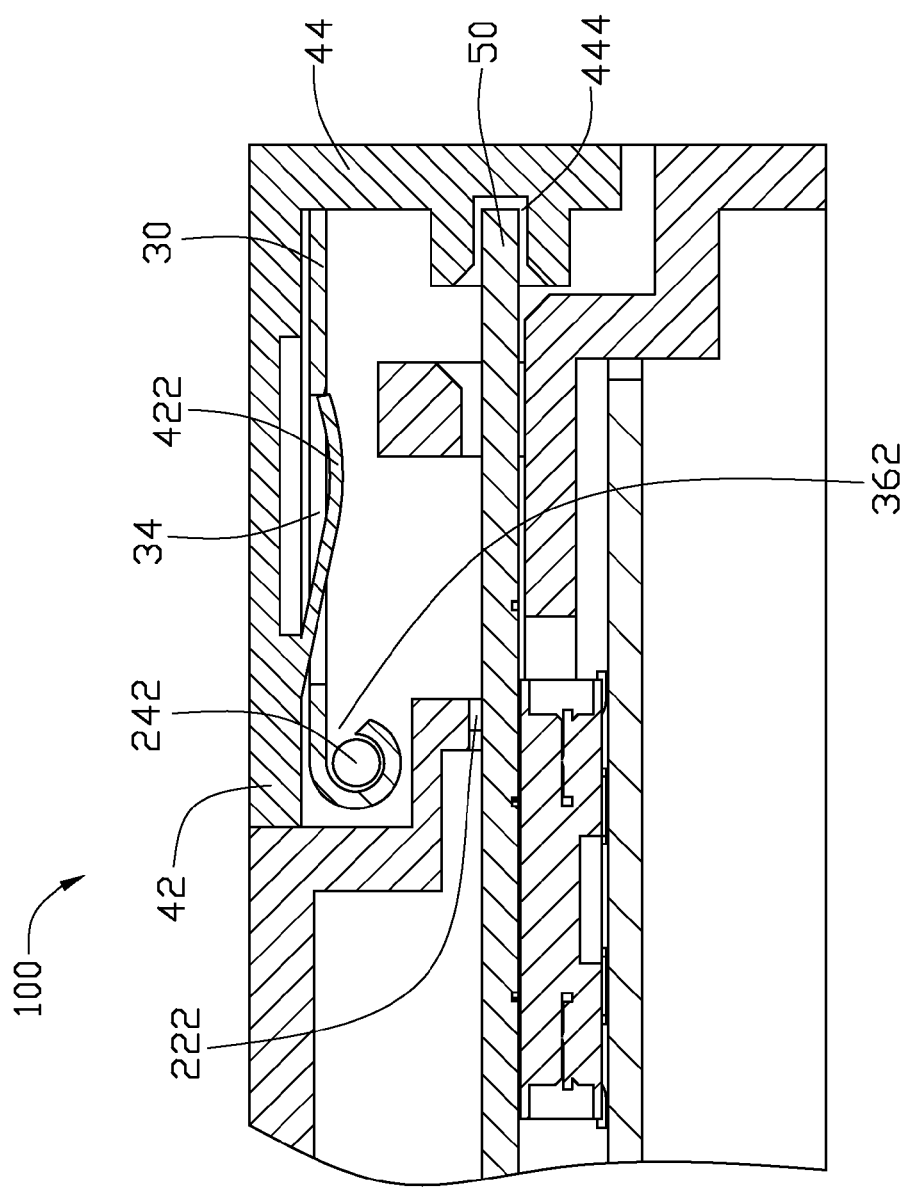
FIG. 5 is a partial, cross-sectional view of the SIM card fixing assembly taken along line V-V of FIG. 4.

Referring to FIGS. 2 and 3, the latching member 40 includes a first plate 42 and a second plate 44 extending perpendicularly from an edge of the first plate 42. The middle of first plate 42 defines a rectangular groove 424. The first plate 42 includes a resilient hook 422 extending from an edge of the rectangular groove 424 and bent toward the second plate 44. The resilient hook 422 is made of elastic materials such as elastic plastic or metal. The second plate 42 includes a protruding wall 442 and two positioning protrusions 446. The protruding wall 442 is positioned on an inner surface of the second plate 44. The protruding wall 442 defines a latching slot 444 to receive the free end of the SIM card 50. The latching slot 444 includes a sidewall 445 adjacent to the resilient hook. The sidewall 445 is substantially wedge-shaped. The two positioning protrusions 446 are positioned on two side surfaces of the protruding wall 442. The two positioning protrusions 446 are engaged with the corresponding latching grooves 244.

The SIM card 50 stores information that is necessary for operating the telephone and personal information of the owner. The SIM card 50 is a kind of integrated circuit card.

The SIM card fixing assembly 20 fixed the SIM card 50 to the electronic device 100 includes following steps. Firstly, an end of the SIM card 50 is inserted into the retaining groove 222 of the receiving portion 21 to be electrically connected to the three resilient connecting portions 224. The positioning bridge 246 resists the SIM card 50. Secondly, the rotary member 30 is rotated relative to the housing 21, such that the other end of the SIM card 50 is mounted into the latching slot 444 of the latching member 40. Finally, the latching member 40 is slid toward to the first surface 22 of the receiving portion 21. The resilient hook 422 is deformed, and resists the latching portion 34 of the rotary member 30. The positioning protrusion 446 is engaged with the latching groove 244. Thus, the SIM card 50 is locked into the receiving portion 21.

The SIM card 50 cannot be disassembled from the electronic device 100 without breaking the SIM card fixing assembly 20. Once the SIM card 50 is locked into the receiving portion 21, it is difficult to replace the SIM card 50. Thus, the SIM card fixing assembly 20 has a theft-proof protection.

It is to be understood that the receiving portion 21 can also be a V-shaped cutout. The receiving portion 21 includes the two second side surfaces 24 and a bottom surface 26, correspondingly, the first side surface 22 is omitted. The retaining groove 222 is defined in the connecting portion of two side surfaces 22.

It is to be understood that the rotary member 30 can also includes two shafts disposed on an edge of the main board 32, correspondingly, each second surface 24 of the receiving portion 21 defines a shaft hole. The two shafts are received in the corresponding shaft holes, such that the rotary member 30 is rotatable relative to the housing 10.

It is to be understood that the protruding wall 442 can also be omitted, correspondingly, the two positioning protrusions 446 are positioned on the two opposite surface of second plate 44.

It is to be understood that the latching portion 34 is a latching protrusion positioned on the middle of the main board 32.

Finally, while the embodiments have been described and illustrated, the disclosure is not to be construed as being limited thereto. Various modifications can be made to the embodiments by those of ordinary skilled in the art without departing from the true spirit and scope of the disclosure as defined by the appended claims.

What is claimed is:

1. A SIM card fixing assembly for fixing a SIM card to an electronic device, the electronic device comprising a housing, the SIM card fixing assembly comprising:
a receiving portion defined in the housing to receive the SIM card, a side surface of the receiving portion defining a retaining groove to receive an end of the SIM card;
a rotary member comprising a latching portion, the rotary member being rotatable relative to the housing; and
a latching member slidably fixed relative to the rotary member, the latching member comprising a first plate and a second plate extending from an edge of the first plate, the first plate comprising a resilient hook extending toward to the second plate, the second plate defining a latching slot to receive the other end of the SIM card; wherein, when the latching member is slid relative to the rotary member, the other end of the SIM card is latched into the latching slot, the resilient hook is engaged with the latching portion.

2. The SIM card fixing assembly of claim 1, wherein the receiving portion comprises a first side surface and two second side surfaces adjoining the first side surface; the first side surface is substantially three-step-shaped, the retaining groove defined in the second step, the rotary member fixed rotatably between the two second side surfaces.

3. The SIM card fixing assembly of claim 2, further comprising a positioning bridge positioned between the two second side surfaces to fix the SIM card in the receiving portion.

4. The SIM card fixing assembly of claim 2, further comprising two shafts positioned on the two second side surfaces, the rotary member further comprising a main board and two shaft tubes disposed on an edge of the main board; and the shaft being received in the corresponding shaft tubes.

5. The SIM card fixing assembly of claim 4, wherein each of the shaft tubes defines an elongated cutout extending along an axial thereof.

6. The SIM card fixing assembly of claim 2, wherein the first plate is perpendicular to the second plate.

7. The SIM card fixing assembly of claim 6, wherein the latching member further comprises a protruding wall disposed on the second plate, the latching groove defined in the protruding wall.

8. The SIM card fixing assembly of claim 7, further comprising two latching groove defined in the two second side surfaces, and two positioning protrusions positioned on two opposite outer surfaces of the protruding wall to engage with the latching groove.

9. The SIM card fixing assembly of claim 7, wherein the first plate defines a rectangular groove below the resilient hook.

10. The SIM card fixing assembly of claim 1, wherein the latching portion is a latching hole to engage with the resilient hook.

11. The SIM card fixing assembly of claim 1, wherein the resilient hook is made of elastic plastic or metal.

12. An electronic device comprising:
a SIM card;
a housing;
a SIM card fixing assembly fixing the SIM card to the housing, the SIM card fixing assembly comprising:
a receiving portion defined in the housing to receive the SIM card, a side surface of the receiving portion defining a retaining groove to receive an end of the SIM card;
a rotary member comprising a latching portion, the rotary member being rotatable relative to the housing; and
a latching member slidably fixed relative to the rotary member, the latching member comprising a first plate and a second plate extending from an edge of the first plate, the first plate comprising a resilient hook extending toward to the second plate, the second plate defining a latching slot to receive the other end of the SIM card; wherein, when the latching member is slid relative to the rotary member, the other end of the SIM card is latched into the latching slot, the resilient hook is engaged with the latching portion.

13. The electronic device of claim 12, wherein the receiving portion comprises a first side surface and two second side surfaces adjoining to the first side surface; the first side surface is substantially three-steps-shaped, the retaining groove defined in the second step, the rotary member fixed rotatably between the two second side surfaces.

14. The electronic device of claim 13, wherein the SIM card fixing assembly further comprises a positioning bridge positioned between the two second side surfaces to fix the SIM card in the receiving portion.

15. The electronic device of claim 13, wherein the SIM card fixing assembly further comprises two shafts positioned on the two second side surfaces, the rotary member further comprising a main board and two shaft tubes disposed on an edge of the main board; and the shaft being received in the corresponding shaft tubes.

16. The electronic device of claim 15, wherein each of the shaft tubes defines an elongated cutout extending along an axial thereof.

17. The electronic device of claim 13, wherein the first plate is perpendicular to the second plate.

18. The electronic device of claim 17, wherein the latching member further comprises a protruding wall disposed on the second plate, the latching groove defined in the protruding wall.

19. The electronic device of claim 18, wherein the SIM card fixing assembly further comprises two latching groove defined in the two second side surfaces, and two positioning protrusions positioned on two opposite outer surfaces of the protruding wall to engage with the latching grooves.

20. The electronic device of claim 18, wherein the first plate defines a rectangular groove below the resilient hook.

* * * * *